(12) United States Patent
Greiner

(10) Patent No.: US 10,572,301 B2
(45) Date of Patent: *Feb. 25, 2020

(54) EXTRACT CPU TIME FACILITY

(71) Applicant: INTERNATIONAL BUSINESS MACHINES CORPORATION, Armonk, NY (US)

(72) Inventor: Dan F. Greiner, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 14/726,772

(22) Filed: Jun. 1, 2015

(65) Prior Publication Data

US 2015/0261565 A1    Sep. 17, 2015

Related U.S. Application Data

(63) Continuation of application No. 13/953,206, filed on Jul. 29, 2013, now Pat. No. 9,047,078, which is a
(Continued)

(51) Int. Cl.
*G06F 9/48* (2006.01)
*G06F 9/30* (2018.01)
*G06F 11/34* (2006.01)

(52) U.S. Cl.
CPC ........ *G06F 9/4825* (2013.01); *G06F 9/30003* (2013.01); *G06F 9/3005* (2013.01);
(Continued)

(58) Field of Classification Search
CPC ............. G06F 11/3419; G06F 9/30003; G06F 9/3005; G06F 9/30087; G06F 9/4825; G06F 9/4887; G06F 2201/88
(Continued)

(56) References Cited

U.S. PATENT DOCUMENTS 4,388,688 A * 6/1983 Curlee, III ............ G06F 9/4825
714/12
4,432,051 A * 2/1984 Bogaert .................... G06F 9/52
717/127

(Continued)

FOREIGN PATENT DOCUMENTS

EP    0076921 A2    2/1982
EP    0076921 B1    12/1989
(Continued)

OTHER PUBLICATIONS

Evangelos Markatos "User-Level Atomic Operations", 1996, pp. 1. Online Referece : "http://archivlsi.ics.forth.gr/html_papers/HPCA97/node17.html".*
(Continued)

*Primary Examiner* — Meng Ai T An
*Assistant Examiner* — Willy W Huaracha
(74) *Attorney, Agent, or Firm* — Steven Chiu, Esq.; Kevin P. Radigan, Esq.; Heslin Rothenberg Farley & Mesiti P.C.

(57) ABSTRACT

An efficient facility for determining resource usage, such as a processor time used by tasks. The determination is performed on behalf of user applications that do not require a call to operating system services. The facility includes an instruction that determines elapsed time and reports it to the user as a single unit of operation.

14 Claims, 6 Drawing Sheets

Related U.S. Application Data continuation of application No. 13/347,223, filed on Jan. 10, 2012, now Pat. No. 8,516,485, which is a continuation of application No. 11/437,220, filed on May 19, 2006, now Pat. No. 8,117,614.

(52) U.S. Cl.
CPC ........ *G06F 9/30087* (2013.01); *G06F 9/4887* (2013.01); *G06F 11/3419* (2013.01); *G06F 2201/88* (2013.01)

(58) Field of Classification Search
USPC .......................................................... 718/100
See application file for complete search history.

(56) References Cited

U.S. PATENT DOCUMENTS

| | | | |
|---|---|---|---|
| 4,497,022 A | 1/1985 | Cormier et al. | |
| 4,937,780 A * | 6/1990 | Geyer | G04F 10/00 713/502 |
| 5,047,928 A | 9/1991 | Wiedemer | |
| 5,072,376 A * | 12/1991 | Ellsworth | G06F 11/3423 713/502 |
| 5,265,249 A | 11/1993 | Kumamoto | |
| 5,274,833 A | 12/1993 | Shima et al. | |
| 5,440,750 A | 8/1995 | Kitai et al. | |
| 5,615,354 A | 3/1997 | Hill et al. | |
| 5,696,702 A | 12/1997 | Skinner et al. | |
| 5,937,199 A * | 8/1999 | Temple | G06F 13/24 710/262 |
| 5,963,914 A | 10/1999 | Skinner et al. | |
| 6,003,022 A | 12/1999 | Eberhard et al. | |
| 6,016,466 A | 1/2000 | Guinther et al. | |
| 6,128,710 A | 10/2000 | Greenspan et al. | |
| 6,247,170 B1 | 6/2001 | Giroux | |
| 6,385,637 B1 * | 5/2002 | Peters | G06F 9/4843 379/265.03 |
| 6,438,704 B1 | 8/2002 | Harris et al. | |
| 7,243,145 B1 * | 7/2007 | Poortman | G06F 11/3419 709/221 |
| 7,272,832 B2 | 9/2007 | Gardner | |
| 7,320,013 B2 | 1/2008 | Mukund et al. | |
| 7,426,731 B2 | 9/2008 | Findeisen | |
| 7,672,983 B2 | 3/2010 | Printezis et al. | |
| 8,117,614 B2 | 2/2012 | Greiner et al. | |
| 8,484,643 B2 * | 7/2013 | Takatsu | G06F 11/3423 718/101 |
| 8,516,485 B2 | 8/2013 | Greiner | |
| 2002/0026291 A1 * | 2/2002 | Lee | G06F 11/3419 702/186 |
| 2003/0120854 A1 | 6/2003 | Chen | |
| 2004/0267548 A1 * | 12/2004 | Jones | G06F 11/3409 705/34 |
| 2005/0086028 A1 * | 4/2005 | Jones | G06F 9/30101 702/187 |
| 2005/0166204 A1 | 7/2005 | Takatsu et al. | |
| 2005/0229176 A1 | 10/2005 | Findeisen | |
| 2007/0150894 A1 * | 6/2007 | Barsness | G06F 9/45533 718/100 |
| 2007/0271566 A1 | 11/2007 | Greiner | |
| 2009/0089123 A1 | 4/2009 | Delcheva et al. | |
| 2013/0311757 A1 | 11/2013 | Greiner | |

FOREIGN PATENT DOCUMENTS

| | | |
|---|---|---|
| EP | 0953908 A2 | 11/1999 |
| JP | 8292956 A | 11/1996 |
| WO | WO9956205 | 4/1999 |
| WO | WO0072143 A1 | 11/2000 |

OTHER PUBLICATIONS

Crowley, Charles, and Gary Klimowicz. "A note on procedure timing." ACM SIGPLAN Notices 14.11 (1979): 19-22.*
Zagha, Marco, et al., "Performance Analysis Using the MIPS R10000 Performance Counters," Proceedings of the 1996 ACM/IEEE Conference on Supercomputing, Jan. 1996, pp. 1-20.
"Z/Architecture: Principles of Operation," IBM Publication No. SA22-7832-04, Fifth Edition, Sep. 2005, pp. 1-1144.
European Search Report for Application No. 08161018.0-2224/1980944, dated Dec. 2008, pp. 1-5.
International Search Report for PCT/EP2006/069989 dated Dec. 20, 2006, pp. 1-3.
Combined Search and Examination Report under Sections 17 & 18(3) for Application No. GB0625722.4 dated Feb. 6, 2007, pp. 1-3.
Tomoyoshi, S. et al., "Table-based QoS Control for Embedded Real-Time Systems," C&C Media Research Laboratories, NEC Corporation, May 1999, pp. 65-72.
O'Neill, P. et al., "Performance Statistics of a Time Sharing Network at a Small University," Communications of the ACM, Jan. 1980, vol. 23, No. 1, pp. 10-13.
Gehringer, Edward et al., "Run-Time Characteristics of a Simulation Model," Symposium on the Simulation of Computer Systems IV, Aug. 1976, pp. 120-128.
Office Action for U.S. Appl. No. 11/437,220 dated Aug. 5, 2010, pp. 1-28.
Markatos, Evangelos, "User-Level Atomic Operations," Nov. 1996, p. 1.
Final Office Action for U.S. Appl. No. 11/437,220 dated Feb. 1, 2011, pp. 1-14.
Davies, Julian, "Clock Architecture and Management," ACM SIGARCH Computer Architecture, vol. 8, Issue 5, Aug. 1980, pp. 3-6.
Office Action for U.S. Appl. No. 13/953,206 dated Oct. 6, 2014, pp. 1-20.
Markatos et al., "User-Level DMA Without Operating System Kernel Modification", Third International Symposium on High-Performance Computer Architecture, Feb. 1997 (11 pages).

* cited by examiner

EXTRACT CPU TIME FACILITY

This application is a continuation of commonly assigned, U.S. Ser. No. 13/953,206, entitled "Extract CPU Time Facility," filed Jul. 29, 2013, now U.S. Pat. No. 9,047,078, issued Jun. 2, 2015, which is a continuation of U.S. Ser. No. 13/347,223, entitled "Extract CPU Time Facility," filed Jan. 10, 2012, now U.S. Pat. No. 8,516,485, issued Aug. 20, 2013, which is a continuation of U.S. Ser. No. 11/437,220, entitled "Extract CPU Time Facility," filed May 19, 2006, now U.S. Pat. No. 8,117,614, issued Feb. 14, 2012, each of which is hereby incorporated herein by reference in its entirety.

BACKGROUND

This invention relates, in general, to processing within a processing environment, and in particular, to a facility to efficiently determine resource usage of tasks.

The determination of resource usage is critical for many aspects of processing, including code refinement, billing, etc. One resource for which utilization is determined is processor time. In the z/Architecture®, offered by International Business Machines Corporation, a timer is provided that measures elapsed central processing unit (CPU) time and causes an interruption when a specified amount of time has elapsed.

This timer is set by a Set CPU Timer (SPT) control instruction, and the contents of the timer are inspected via a Store CPU Time (STPT) control instruction. Both of these instructions are privileged instructions to ensure the accuracy of the time, and as such are not usable by problem-state programs (i.e., user programs).

In addition to the above, the z/OS® operating system, offered by International Business Machines Corporation, also provides a service routine referred to as TIMEUSED, which is available to problem-state programs. A program or operation calls the service to determine the amount of CPU time a piece of code (e.g., task) has used. The TIMEUSED service routine computes the elapsed time, adds the accumulated time, and returns the value to the program. The calculations of the TIMEUSED routine must be performed while being disabled for interruptions, since any interruption could adversely effect the results by manipulating the CPU timer or the accumulator.

The TIMEUSED service routine is linked via program call and program return instructions. This routine disables for interruptions, obtains and releases a CPU lock, establishes a recovery environment, calculates the elapsed time, and re-enables after having completed its work, all of which takes hundreds of CPU cycles. When attempting to measure a small fragment of code, the overhead of the TIMEUSED service routine can severely perturb what is being measured.

BRIEF SUMMARY

Based on the foregoing, a need exists for a facility to efficiently determine resource usage, such as elapsed CPU time of a task. In particular, a need exists for a facility that efficiently determines resource usage of tasks without calling operating system services. A need exists for the ability of a user to efficiently determine resource usage.

The shortcomings of the prior art are overcome and additional advantages are provided through the provision of a computer program product for executing a machine instruction in a processing environment, the processing environment supporting a privileged mode in which both privileged and non-privileged instructions are executable and a non-privileged mode in which only non-privileged instructions are executable. The computer program product including, for instance, a computer readable storage medium readable by a processing circuit and storing instructions for execution by the processing circuit for performing a method including, for instance, obtaining a non-privileged extract CPU time machine instruction to be executed, the non-privileged extract CPU time machine instruction having an operand field that at least partially identifies a memory location to store a central processing unit (CPU) timer value obtained by a privileged instruction; and executing the non-privileged extract CPU time machine instruction, the executing including obtaining the stored CPU timer value from the memory location; obtaining a current CPU timer value from a CPU timer; subtracting the current CPU timer value from the stored CPU timer value; and storing the result of the subtracting.

System and methods corresponding to the above-summarized computer program product, as well as one or more instructions, are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a facility is provided to efficiently determine resource usage of tasks executing within a processing environment. In one example, a facility is provided in which a user (e.g., user code, user application, user program, etc.) can accurately measure the processor time required to execute a particular code fragment (referred to herein as a task). This facility determines the elapsed processor time without significant overhead that has skewed such measurements, such as overhead associated with using an operating system service to determine the elapsed time.

Figure 1:
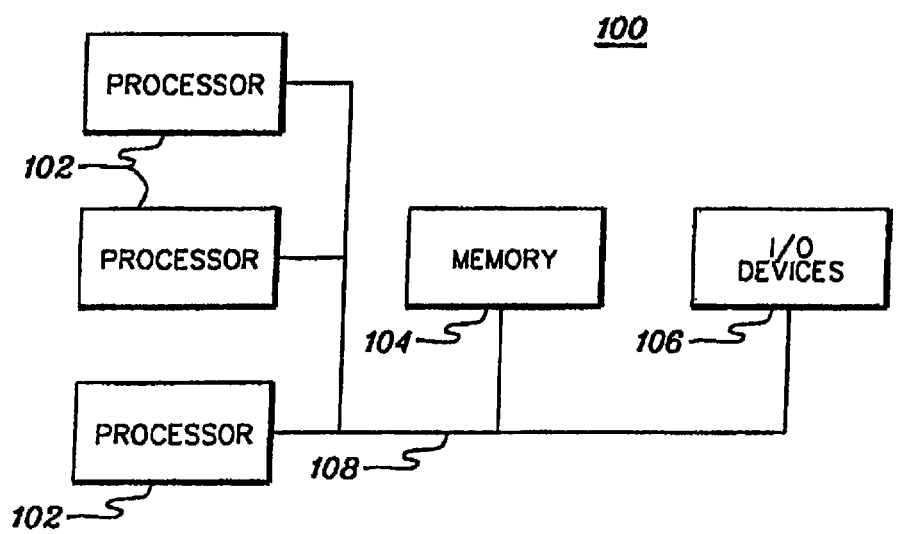
FIG. 1 depicts one embodiment of a processing environment incorporating and using one or more aspects of the present invention.

One embodiment of a processing environment incorporating and using one or more aspects of the present invention is described with reference to FIG. 1. Processing environment 100 is, for instance, a multi-processing environment including a plurality of processors 102 (e.g., central processing units (CPUs)), a memory 104 (e.g., main memory) and one or more input/output (I/O) devices 106 coupled to one another via, for example, one or more buses 108 or other connections.

As one example, each processor 102 is an IBM System z™ server, offered by International Business Machines Corporation, Armonk, N.Y., and one or more of the processors execute an operating system, such as z/OS®, also offered by International Business Machines Corporation. (IBM and z/OS are registered trademarks of International Business Machines Corporation, Armonk, N.Y., USA. Other names used herein may be registered trademarks, trademarks or product names of International Business Machines Corporation or other companies.)

Processing within the processing environment is facilitated by the provision of a facility that enables the determination of resource usage, such as elapsed processor (e.g., CPU) time, without requiring the call of an operating system service or without using privileged instructions or operations.

Figure 2:
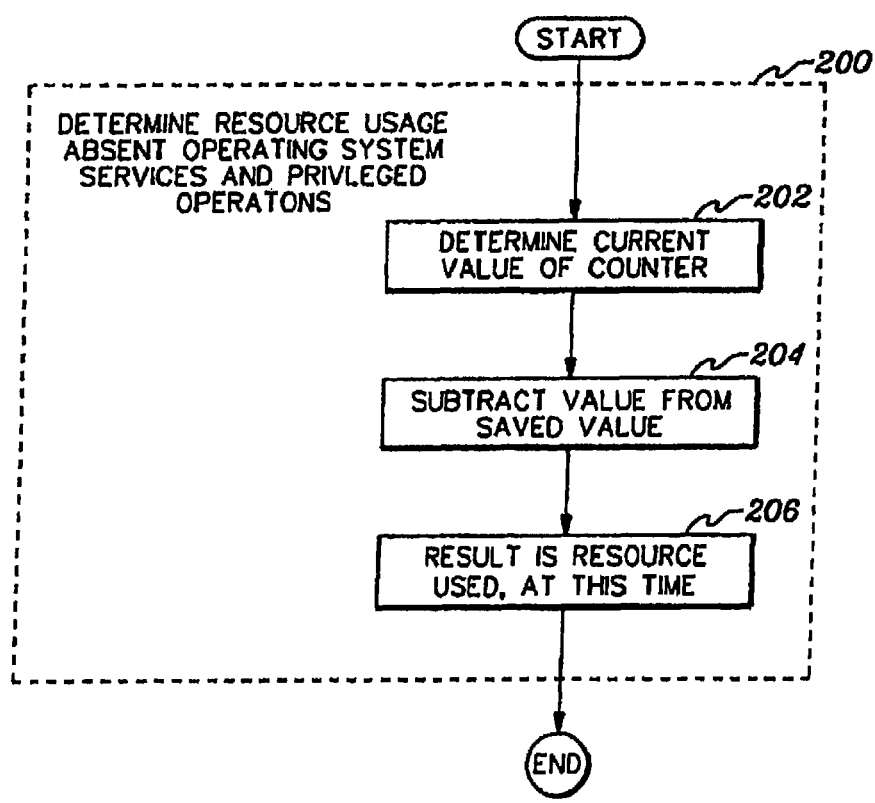
FIG. 2 depicts one embodiment of the logic associated with determining resource usage, in accordance with an aspect of the present invention.

One embodiment of the logic associated with determining resource usage is described with reference to FIG. 2. This logic is executed by a processing unit of the processing environment, in response to, for instance, a request by a user application (e.g., non-privileged code). The resource usage is determined for a task absent a call to an operating system service and without using privileged operations, STEP 200.

Initially, a current value of a counter used to track the resource for the task, such as time used, is determined by reading the counter value, as instructed by the logic, STEP 202. The determined value is then subtracted from a saved value, which is, for instance, the value of the counter when it was started, STEP 204. In one example, the counter decrements as the resource is used by the task and the current value of the counter is read, in response to the request. The result of the subtraction represents the amount of resource used by the task for this time interval, which is defined by the beginning and ending values of the counter, STEP 206.

In one example, the operations used to determine resource usage are performed by an instruction. As a specific example, an instruction is provided to determine an amount of processor time used by a task. The instruction can be implemented in many architectures and may be emulated. As examples, the instruction is executed in hardware by a processor; or by emulation of an instruction set that includes this instruction, by software executing on a processing unit having a different native instruction set. In one particular example, the instruction is implemented in the z/Architecture, offered by International Business Machines Corporation, and is referred to herein as an Extract CPU Time (ECTG) instruction.

Figure 3:
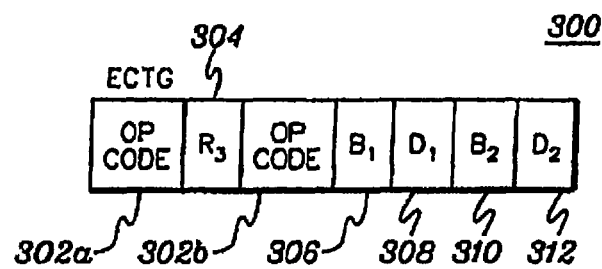
FIG. 3 depicts one example of a format of an Extract CPU Time instruction used in accordance with an aspect of the present invention.

An Extract CPU Time instruction 300 (FIG. 3) is a non-privileged instruction, and includes, for instance, an operation code 302a, 302b designating the Extract CPU Time instruction; a general register 304, the contents of which specify a third operand used by the instruction; a base register 306, which may be any of sixteen general purpose registers of the processing unit and includes a portion of an address of a first operand in storage used by the instruction; a displacement value 308, which is, for instance, an unsigned 12 bit binary number added to the contents of register 306 to provide the address of the first operand in storage; a base register 310, which again is any of the sixteen general purpose registers in the processing unit and includes a portion of an address of a second operand in storage used by the instruction; and a displacement value 312, which is added to the contents of register 310 to provide the address of the second operand in storage for the instruction.

In addition to the registers described above, the Extract CPU Time instruction also implicitly uses two general registers that do not have to be encoded in the instruction, but are used by the instruction. These registers include general register 0 and general register 1.

Figure 4A:
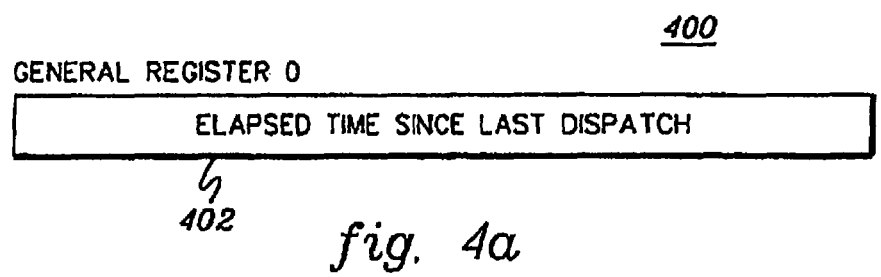
FIG. 4a depicts one embodiment of the fields of general register 0 used by the Extract CPU Time instruction of one aspect of the present invention.

General register 0 (400, FIG. 4a) includes, for instance, the elapsed time since last dispatch of the task 402. It is the difference resulting from subtracting the value of the current CPU timer from the first operand, the contents of which include the value of the CPU timer at task dispatch.

Figure 4B:
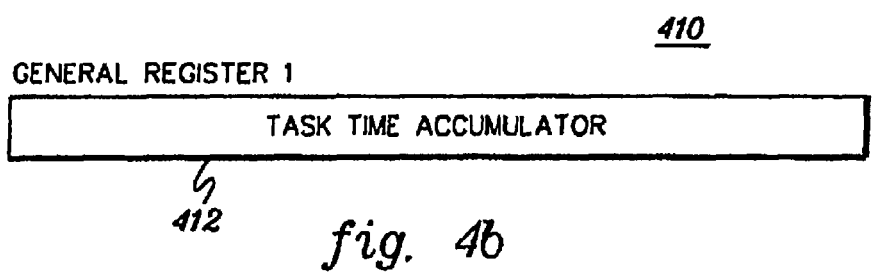
FIG. 4b depicts one embodiment of the fields of general register 1 employed by the Extract CPU Time instruction of one aspect of the present invention.

General register 1 (410; FIG. 4b) includes, for instance, a value of the task time accumulator when the task was dispatched 412. This is the contents of the second operand of the instruction.

Although examples of registers are described above, each of the registers may include more, less or different information. Further, each may include additional data not necessarily needed in one or more aspects of the present invention. The specific location within the registers for the information is implementation and/or architecture dependent.

Figure 5:
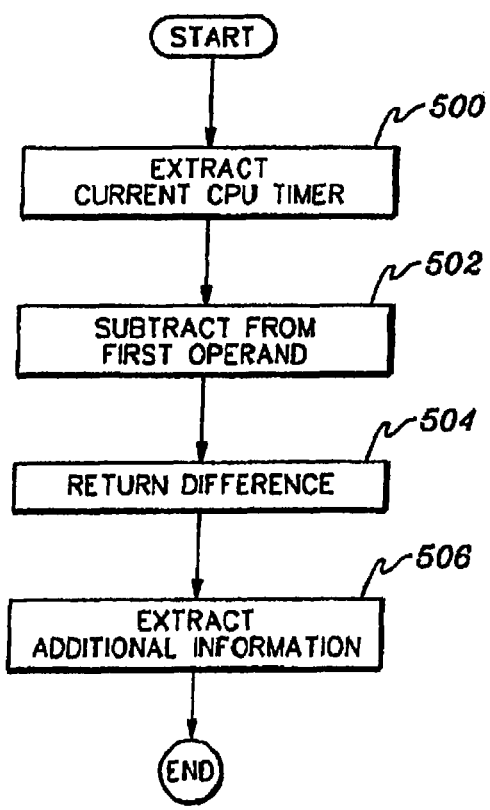
FIG. 5 depicts one embodiment of the logic associated with executing the Extract CPU Time instruction, in accordance with an aspect of the present invention.

One embodiment of the logic associated with the Extract CPU Time instruction is described with reference to FIG. 5. As one example, this instruction is executed by a processor of the processing environment on behalf of a non-privileged user application (e.g., in problem state) that requests the operation as it relates to a particular task. The Extract CPU Time instruction is a non-privileged instruction that does not invoke an operating system service. It does, however, assume in this embodiment, that the CPU timer (e.g., counter, register, etc.) is set when a task is dispatched. In embodiments, the CPU timer provides a means for measuring elapsed CPU time and for causing an interruption when a specified amount of time has elapsed. In one example, the timer is set by a Set CPU Timer (STP) instruction, which is a privileged instruction described in z/Architecture: Principles of Operation, IBM® Publication No. SA22-7832-4, Sep. 2005, which is hereby incorporated herein by reference in its entirety. It may also be set by any other means. The timer is set to a given value which represents a specified time slice for execution of the task (e.g., 10-12 ms).

In response to executing the Extract CPU Time instruction, the current value of the CPU timer is determined, STEP 500. For instance, the timer decrements as the processor processes the task, and in response to executing the Extract CPU Time instruction, the value of the timer, at that time, is observed. This includes, for instance, reading the register that holds the timer. In one embodiment, the value of the timer can be extracted at any time, including prior to the end of the time slice provided for the task and without waiting for an interruption of the timer.

The current value of the CPU timer is then subtracted from the first operand of the instruction, STEP 502. The first operand represents the value of the CPU timer at the time the task was dispatched. For example, when a task is dispatched, the CPU timer is set to a chosen value (e.g., 10-12 ms) and that value is stored in storage (e.g., PSDATSAV). Thus, PSADTSAV−current CPU Timer=elapsed processor time since last dispatch of the task. This value is placed in general register 0, STEP 504.

In addition to the above, additional information is also extracted, in one embodiment, STEP 506. As one example, the second operand of the instruction is placed unchanged in general register 1. The second operand includes, for instance, an address of a task control block (e.g., TCBT-TUSD) that maintains the previously used amount of total CPU time for the task. By extracting and placing this information in general register 1, the user application is able to determine the total amount of processor time used thus far, by adding the results of general register 0 and general register 1.

Also, in one embodiment, information at the third operand location of the instruction replaces the contents of general register $R_3$. This information includes various types of information, including but not limited to, flags designating information important or desired for the task, a scaling factor usable in adjusting the processor time for billing purposes, as well as other types of information.

Figure 6:
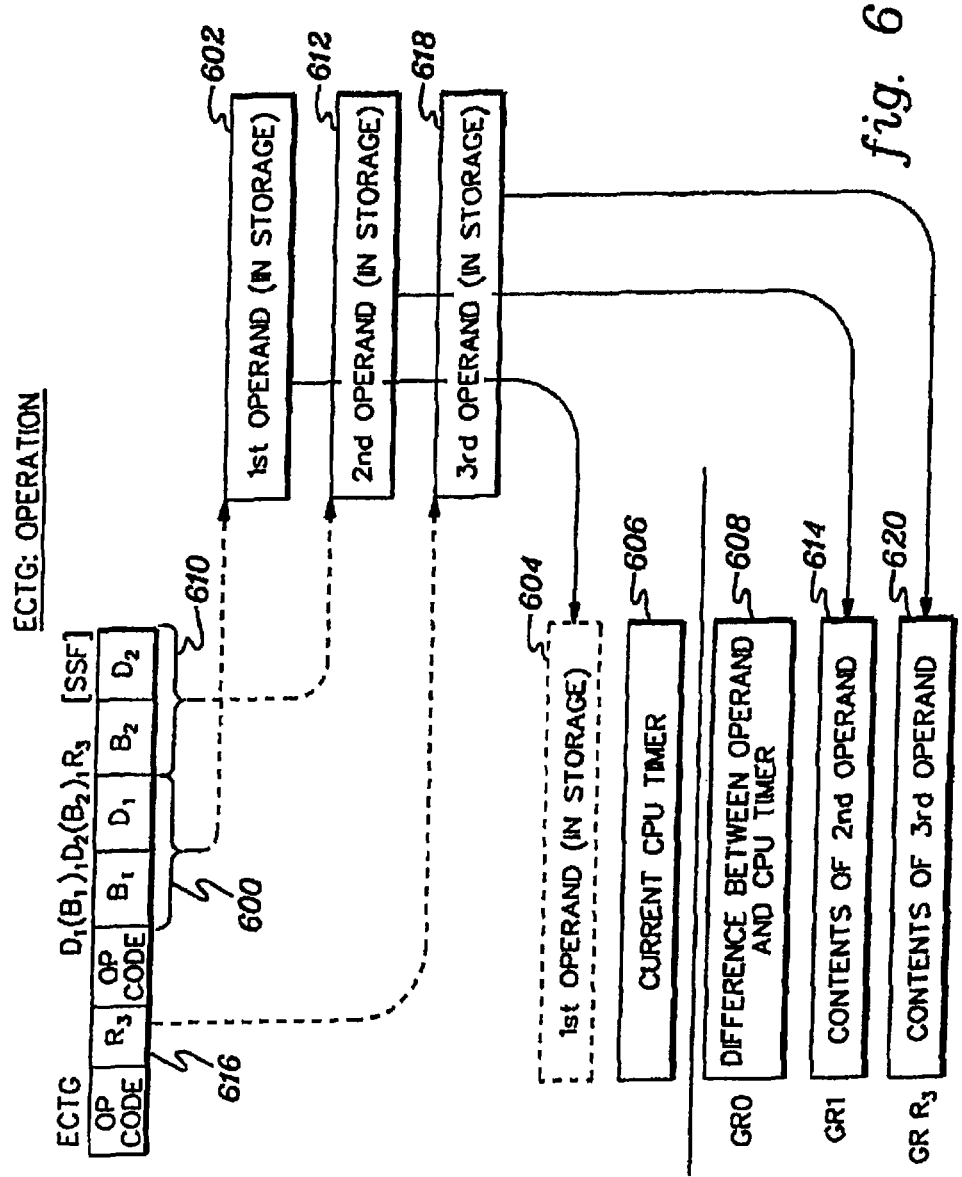
FIG. 6 is a pictorial representation of the operations of the Extract CPU Time instruction of one aspect of the present invention.

A pictorial representation of the operations is depicted in FIG. 6. $B_1D_1$ (600) reference a first operand in storage 602. Subtracted from the contents of the first operand 604 is the current value of the CPU timer 606. The difference is stored in general register 0 (608). $B_2D_2$ (610) reference a second operand in storage 612, the contents of which are placed unchanged in general register 1 (614). Additionally, $R_3$ (616) references a third operand in storage 618, the contents of which are placed unchanged in general register $R_3$ (620).

In one embodiment, the above operations all occur within the same unit of operation, without the possibility of being interrupted. By performing these operations atomically, the values retain their meanings.

Described in detail above is a facility to efficiently determine resource usage without the overhead associated with costly operating system services and/or without using privileged operations. In particular, an Extract CPU Time facility is described that enables the efficient determination of the amount of CPU time consumed, without the costly overhead of calling an operating system service and/or without issuing Program Call and/or Program Return instructions. This facility enables an application program to accurately measure the CPU time required to execute a particular code fragment without the significant overhead that has traditionally skewed such measurements. The measurements are useful in many aspects, including, but not limited to, fine tuning of application code and billing. The facility advantageously enables an application program to efficiently determine the amount of task time used at any given moment, and not just at the end of a time slice. This allows the program to effectively determine instruction timings in the microsecond or nanosecond range without having to wait until milliseconds have elapsed.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 7:
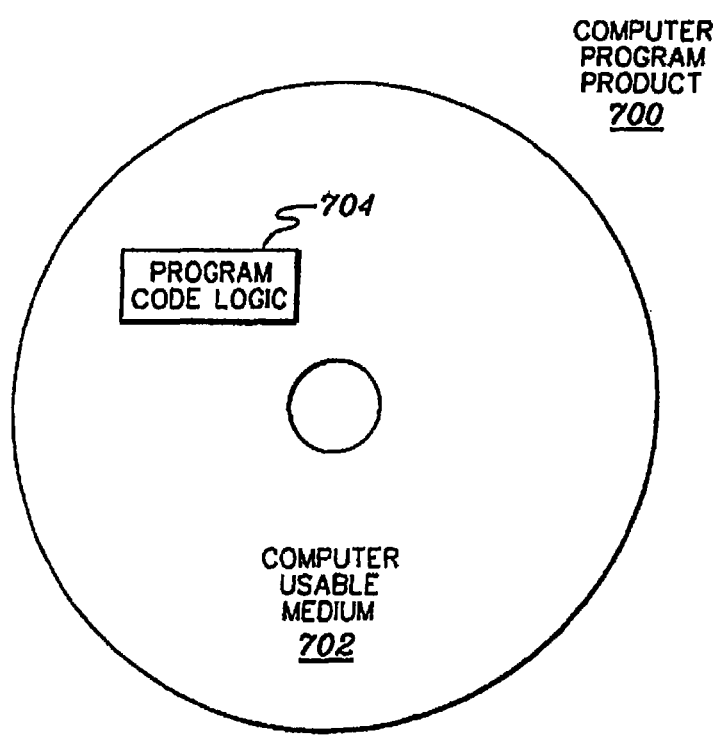
FIG. 7 depicts one example of a computer program product incorporating one or more aspects of the present invention.

One example of an article of manufacture or a computer program product incorporating one or more aspects of the present invention is described with reference to FIG. 7. A computer program product 700 includes, for instance, one or more computer usable media 702 to store computer readable program code means or logic 704 thereon to provide and facilitate one or more aspects of the present invention. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although one or more examples have been provided herein, these are only examples. Many variations are possible without departing from the spirit of the present invention. For instance, processing environments other than the example provided herein may include and/or benefit from one or more aspects of the present invention. As an example, one or more processors can be other than IBM System z™ processors and/or execute operating systems other than z/OS®. Further, the environment need not be based on the z/Architecture, but instead, can be based on other architectures, offered by, for instance, Intel, Sun Microsystems, as well as others. Yet further, the instruction can include other registers or entities other than registers to designate information. Further, different data and/or positioning within the registers and/or entities are possible. Still further, the timer can be other than counters or registers. Any mechanism can be used to determine resource usage. The term "timer" is meant to include a broad spectrum of mechanisms, including, but not limited to, counters and registers. Further, although in the embodiments herein, the timer decrements, in other embodiments, it may increment and/or follow some pattern. Many other variations exist.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

As used herein, the term "operand" not only includes and/or refers to operands of an instruction, but also other operands, as well as parameters or arguments passed between functions of programs, or any other data that is passed between entities. Further, a task includes any portion of code, including an entire application or program or any portion thereof.

The capabilities of one or more aspects of the present invention can be implemented in software, firmware, hardware or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for determining elapsed processor time of tasks executing in a processing environment without calling an operating system service, the processing environment supporting both privileged instructions and non-privileged instructions, the computer program product comprising:
   a non-transitory computer readable storage medium readable by a processing circuit and storing instructions for execution by the processing circuit for performing a method comprising:
      receiving, from a user application, which is a non-privileged code, a request to determine an elapsed processor time for a task;
      obtaining, based on the request, an extract central processing unit (CPU) time machine instruction to be executed to determine the elapsed processor time of the task, the extract CPU time machine instruction being a non-privileged instruction and including at least three or more fields;
      a first one of the at least three or more fields to specify an operation code indicating a non-privileged extract CPU operation;
      a second one of the at least three or more fields is to be used to identify an address of a memory location that stores an initial value of a CPU timer, wherein the initial value of the CPU timer is set and stored in the memory location based on dispatching the task and by executing a privileged Set CPU Timer machine instruction;
      a third one of the at least three or more fields is to be used to identify another memory location to be used to obtain a value that represents previously used total CPU time for the task;
      another field of the at least three or more fields is to be used to specify a scaling factor usable in adjusting processor time; and
      executing the extract CPU time machine instruction, said executing comprising:
         obtaining from the memory location the initial value of the CPU timer stored by the privileged Set CPU Timer machine instruction;
         obtaining a current value of the CPU timer;
         subtracting the current value of the CPU timer from the initial value of the CPU timer to obtain a result;
         providing in a location specified by the extract CPU time machine instruction the scaling factor to be used to adjust processor time for billing; and
         storing the result of the subtracting, the result indicating an amount of CPU time used by the task since a last dispatch of the task, wherein the obtaining the initial value, the obtaining the current value, the subtracting, the providing and the storing are performed within a same unit of operation without being interrupted.

2. The computer program product of claim 1, wherein the CPU timer is configured to be decremented as time elapses and is configured to cause an interrupt if a threshold value is reached.

3. The computer program product of claim 1, wherein the method is performed on a processing unit that is emulating the execution of the extract CPU time machine instruction.

4. The computer program product of claim 1, wherein the CPU timer is a counter set based on dispatching the task.

5. The computer program product of claim 1, wherein the CPU timer is a register set based on dispatching the task.

6. A computer system for determining elapsed processor time of tasks executing in a processing environment without calling an operating system service, the processing environment supporting both privileged instructions and non-privileged instructions, the computer system comprising:
   a memory; and
   a processor in communications with the memory, wherein the computer system is configured to perform a method, said method comprising:
      receiving, from a user application, which is a non-privileged code, a request to determine and elapsed processor time for a task;
      obtaining, based on the request, an extract central processing unit (CPU) time machine instruction to be executed to determine the elapsed processor time of the task, the extract CPU time machine instruction being a non-privileged instruction and including at least three or more fields;
      a first one of the at least three or more fields to specify an operation code indicating a non-privileged extract CPU operation;
      a second one of the at least three or more fields is to be used to identify an address of a memory location that stores an initial value of a CPU timer, wherein the initial value of the CPU timer is set and stored in the member location based on dispatching the task and by executing a privileged Set CPU Timer machine instruction;

a third one of the at least three or more fields is to be used to identify another memory location to be used to obtain a value that represents previously used total CPU time for the task;

another field of the at least three or more fields is to be used to specify a scaling factor usable in adjusting processor time; and executing the extract CPU time machine instruction, said executing comprising:

obtaining from the memory location the initial value of the CPU timer stored by the privileged Set CPU Timer instruction;

obtaining a current value of the CPU timer;

subtracting the current value of the CPU timer from the initial value of the CPU timer to obtain a result;

providing in a location specified by the extract CPU time machine instruction the scaling factor to be used to adjust processor time for billing; and storing the result of the subtracting, the result indicating an amount of CPU time used by the task since a last dispatch of the task, wherein the obtaining the initial value, the obtaining the current value, the subtracting, the providing and the storing are performed within a same unit of operation without being interrupted.

7. The computer system of claim 6, wherein the CPU timer is configured to be decremented as time elapses and is configured to cause an interrupt if a threshold value is reached.

8. The computer system of claim 6, wherein the method is performed on a processing unit that is emulating the execution of the extract CPU time machine instruction.

9. The computer system of claim 6, wherein the CPU timer is a counter set based on dispatching the task.

10. The computer system of claim 6, wherein the CPU timer is a register set based on dispatching the task.

11. A method of determining resource usage of tasks executing in a processing environment, the processing environment supporting both privileged instructions and non-privileged instructions, the method comprising:

receiving, from a user application, which is a non-privileged code, a request to determine an elapsed processor time for a task;

obtaining, based on the request, an extract central processing unit (CPU) time machine instruction to be executed to determine the elapsed processor time of the task, the extract CPU time machine instruction being a non-privileged instruction and including at least three or more fields;

a first one of the at least three or more fields to specify an operation code indicating a non-privileged extract CPU operation;

a second one of the at least three or more fields is to be used to identify an address of a memory location that stores an initial value of a CPU timer, wherein the initial value of the CPU timer is set and stored in the memory location based on dispatching the task and by executing a privileged Set CPU Timer machine instruction;

a third one of the at least three or more fields is to be used to identify another memory location to be used to obtain a value that represents previously used total CPU time for the task;

another field of the at least three or more fields is to be used to specify a scaling factor usable in adjusting processor time; and executing the extract CPU time machine instruction, said executing comprising:

obtaining from the memory location the initial value of the CPU timer stored by the privileged Set CPU Timer machine instruction;

obtaining a current value of the CPU timer;

subtracting the current value of the CPU timer from the initial value of the CPU timer to obtain a result;

providing in a location specified by the extract CPU time machine instruction the scaling factor to be used to adjust processor time for billing; and storing the result of the subtracting, the result indicating an amount of CPU time used by the task since a last dispatch of the task, wherein the obtaining the initial value, the obtaining the current value, the subtracting, the providing and the storing are performed within a same unit of operation without being interrupted.

12. The method of claim 11, wherein the CPU timer is configured to be decremented as time elapses and is configured to cause an interrupt if a threshold value is reached.

13. The method of claim 11, wherein the method is performed on a processing unit that is emulating the execution of the extract CPU time machine instruction.

14. The computer-implemented method of claim 11, wherein the CPU timer is one of a counter or a register set based on dispatching the task.

* * * * *